United States Patent [19]

Smith

[11] Patent Number: 4,909,563

[45] Date of Patent: Mar. 20, 1990

[54] AUTOMATICALLY DEPLOYABLE COVERING DEVICE

[75] Inventor: C. Frank Smith, Lakeside, Calif.

[73] Assignee: Phillip E. Walker, Santee, Calif.

[21] Appl. No.: 339,204

[22] Filed: Apr. 12, 1989

[51] Int. Cl.⁴ .............................................. B60J 11/00
[52] U.S. Cl. ....................................... 296/98; 100/272
[58] Field of Search .................. 296/98, 100; 160/272, 160/270; 220/200

[56] References Cited

U.S. PATENT DOCUMENTS

| | | | |
|---|---|---|---|
| 3,498,666 | 3/1970 | Harrawood | 296/98 |
| 3,656,802 | 4/1972 | White | 296/98 |
| 3,819,082 | 6/1974 | Rosenvold | 296/100 |
| 4,050,734 | 9/1977 | Richard | 296/98 |
| 4,138,154 | 2/1979 | McKeon | 296/98 |
| 4,212,492 | 7/1980 | Johnson | 296/98 |
| 4,302,043 | 11/1981 | Dimmer et al. | 296/98 |
| 4,341,416 | 7/1982 | Richard | 296/98 |
| 4,659,134 | 4/1987 | Johnson | 296/98 |
| 4,757,062 | 4/1987 | Tuerk | 296/98 |
| 4,784,427 | 11/1988 | Burgess | 296/98 |

Primary Examiner—Robert R. Song
Attorney, Agent, or Firm—Norman B. Rainer

[57] ABSTRACT

An improved overhead covering device is provided for transportable open top cargo compartments of rectangular configuration. The covering device consists of a flexible cover, the underside of which has a number of parallel reinforcing slats adapted to slidably engage channels associated with the side walls of the cargo compartment. A drum, driven by a motor, enables the cover to be wound up for storage within a housing. The same motor pulls a cable which travels about a pulley wheel at the end of the cargo compartment and deploys the cover from the housing.

6 Claims, 4 Drawing Sheets

AUTOMATICALLY DEPLOYABLE COVERING DEVICE

BACKGROUND OF THE INVENTION

This invention relates to a covering device generally applicable to any box-shaped unit including, but not limited to, loaded and unloaded open cargo areas of trucks and trailers. More particularly, this invention concerns an improved overhead, sliding, reinforced and motorized covering device.

The necessarity for these covers has resulted in part from local and state highway regulations that require trucks and trailers which haul material such as sand, gravel, land fill, and refuse to have the top of the open body of the loaded truck and trailer covered with a tarpaulin-type device. Past practice has been for the truckers to carry the tarpaulin in a convenient location. When the truck is load, it is necessary to manually spread this tarpaulin over the load. The tarpaulin must then be tied down minimally at its four corners to secure it in position. This is a time consuming process that a hazardous when the truck surfaces are climbed upon and more so when said surfaces are wet and slippery. In large trucks and trailers, it should be remembered that the top of the truck body is some nine feet above the ground. Therefore, it is desirable that automatic means be provided to obviate the need for the trucker to climb upon the body of the truck to pull a tarpaulin over the loose load. Recent developments have produced some devices that mechanicaly extend and rtract the tarpaulin in the operation of covering the open body of the truck. However, with one exception, all of these devices still retain the safety hazards of requiring that the operator get out of the truck to tie down the tarpaulin.

Earlier covering devices have further shortcomings. Firstly, they are easily ripped or torn, which requires their periodic replacement. Secondly, due to their sagging nature, they may often be soiled or contaminated by the cargo transported, which also requires their periodic replacement. Thirdly, they may often be thrown off the truck by high winds or high speeds of the truck. Fourthly, they do not effectively completely cover the cargo, which may lead to loss of cargo during transport, or cause air pollution, as when items such as coal, sand, dirt or other substances capable of airborne distribution are transported. In addition, the load may be of light weight absorbent material, such as wood chips, which will retain rainwater and become considerably more costly to haul in terms of weight and load spoilage. Fifthly, substantial down-time is required of the driver, truck, and trailer in order to cover and uncover truck and trailer cargo areas. Sixthly, due to inadequacy of existing covers in addition to the aforementioned down-time, truck and trailer cargo areas are not covered when empty thereby causing extreme in-transit aerodynamic drag resulting in excessive fuel consumption and earlier engine failure.

Similar problems are encountered in other open top transportable cargo compartments such as railroad cars, containers for shipboard or aircraft loading, and refuse collecting bins which are parked until filled, then transported. In general, such cargo compartments are of rectangular configuration, and most are equipped for wheeled transportion.

Accordingly, it is an object of the present invention to provide an improved covering device for transportable open top cargo compartments of rectangular configuration, said device being automatically deployable.

It is another object of the present invention to provide a covering device as in the foregoing object comprising an assembly which affords a reinforced overhead covering for effectively sealing the cargo compartment of a truck or trailer.

It is a further object of the present invention to provide a covering device of the aforesaid nature of durable construction and amenable to low cost manufacturers.

It is an additional object of the present invention to eliminate any driver, truck and trailer down-time related to the covering and uncovering of cargo areas.

It is yet another object of the present invention to provide a covering device of the aforesaid nature which will increase the aerodynamic efficiency of trucks and trailers by covering their cargo compartments whether loaded or empty.

SUMMARY OF THE INVENTION

The above and other beneficial objects and advantages are accomplished in accordance with the present invention by an improved overhead covering device for a bulk-loading truck and/or trailer having an open-top cargo space bounded by front, opposed side, and rear walls, said walls having upper edges, said covering device comprised of:

(a) a storage housing having front, top, bottom, and opposed side panels, and a rear panel fixedly associated with said front wall and having an elongated opening disposed above said upper edge of said front wall, said opposed side panels having inner and outer surfaces, coaxially aligned central apertures, and bushings associated with said apertures, said bushings having centered cylindrical bores coaxially aligned with said apertures, (b) a cylindrical winding drum disposed between said side panels, and coaxially mounted upon a drum shaft, said drum shaft having opposed extremities journaled to said bushings, (c) paired parallel horizontal elongated guide means attached to the upper edges of said side walls, having rear extremities associated with said rear panel and front extremities associated with said front panel, said guide means having facing channels horizontally aligned with said elongated opening, (d) a flexible fabric cover having upper and lower surfaces, opposed edges, a proximal extremity tangentially affixed to said drum, and a free distal extremity, said cover having a multiplicity of rigid, parallel, elongated, reinforcing slats of uniform cross section and spaced apart in a horizontal plane, said slats attached to said cover and having opposed ends extending beyond said opposed edges and adapted to slidably engage said channels, said cover adapted to be spirally wound upon said drum, thereby causing forward movement of said slats within said channels, (e) a flanged cylindrical spool coaxially mounted upon one of said opposed extremities of said drum shaft, (f) a freely rotatable pulley fixedly associated with said upper edge of said rear wall, (g) a flexible cable having a first extremity tangentially affixed to said spool and adapted to be spirally wound thereupon counter-rotationally with respect to said cover upon said drum, said cable having a second extremity extending rearwardly, around said pulley and fixedly asociated with said distal extremity of said cover, (h) a flanged, cylindrical, drum shaft pulley coaxially mounted upon one of said opposed extremities, (i) motor means fixedly associated with said housing and having a rotating drive shaft disposed in parallel relationship with said drum shaft, said drive shaft having a proximal extremity associated with said motor means, and a distal extremity terminating in a flanged drive pulley in parallel, coplanar disposition to said drum pulley, and (j) a continuous flexible drive belt adapted to rotatively engage said drum pulley and said drive pulley.

In a preferred embodiment, a rigid transverse member may be associated with the distal extremity of said cover and may have a weatherstrip affixed to the rear edge to seal against the rear wall of the cargo space.

In another preferred embodiment, the device may employ tensioning pulley means in order to take up slack in the cable created by the varying diameter of the cover as it is wound and unwound from the drum. The tensioning means will serve to provide a more uniform motion of the cover.

In some embodiments the drum and drive pulleys may be in the form of chain-tooth sprocket wheels, in which case the belt is in the form of a ladder-type drive chain.

The channels of the guide means may be lined with a resilient material to facilitate frictionless sliding of the ends of the slats.

In certain embodiments the edges of the cover may be reinforced by an additional flexible layer.

In yet another embodiment the motor means may be omitted and a suitable hand-crank means provided.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
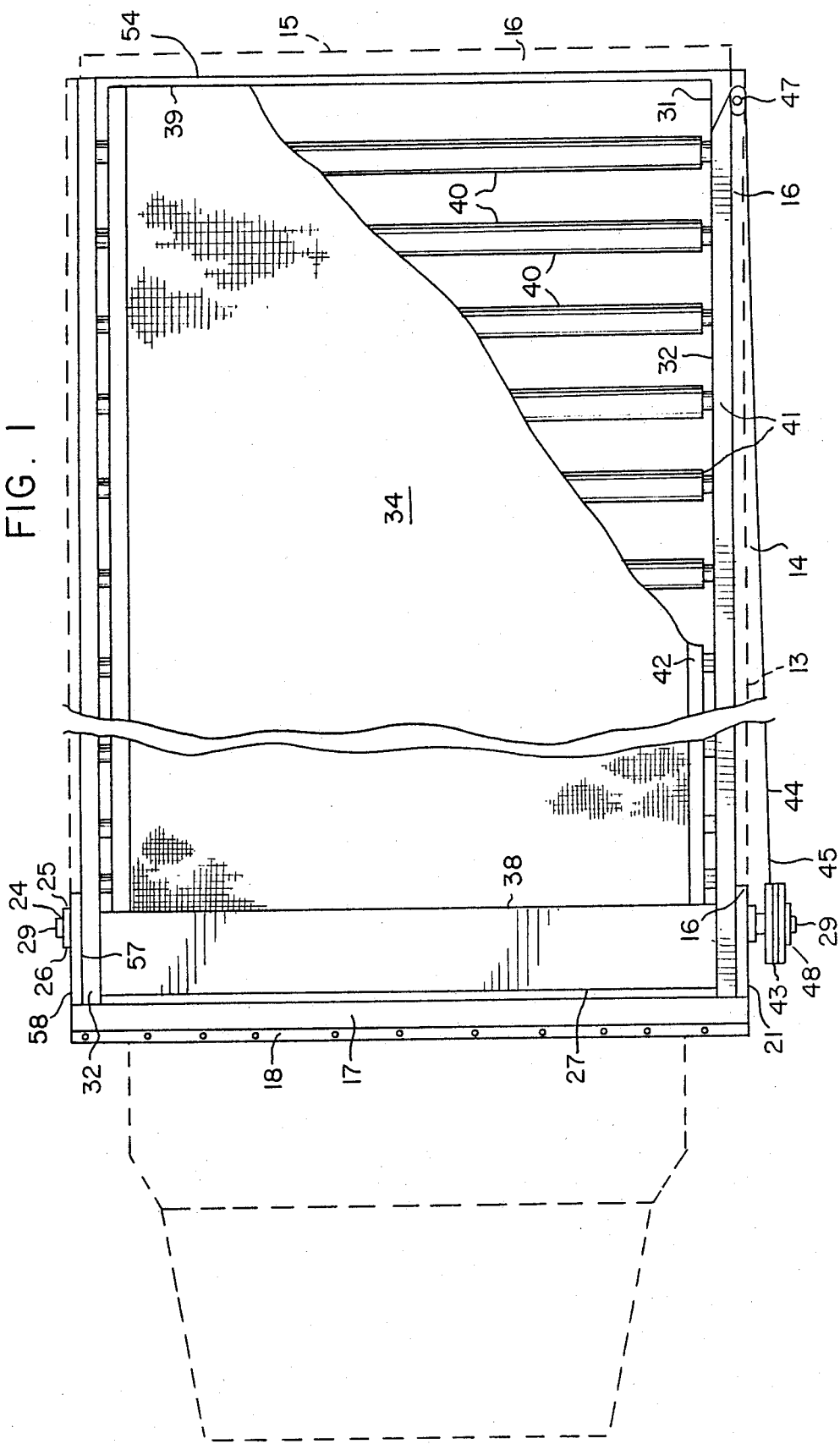
FIG. 1 is a top view of an embodiment of the covering device of the present invention.
Figure 2:
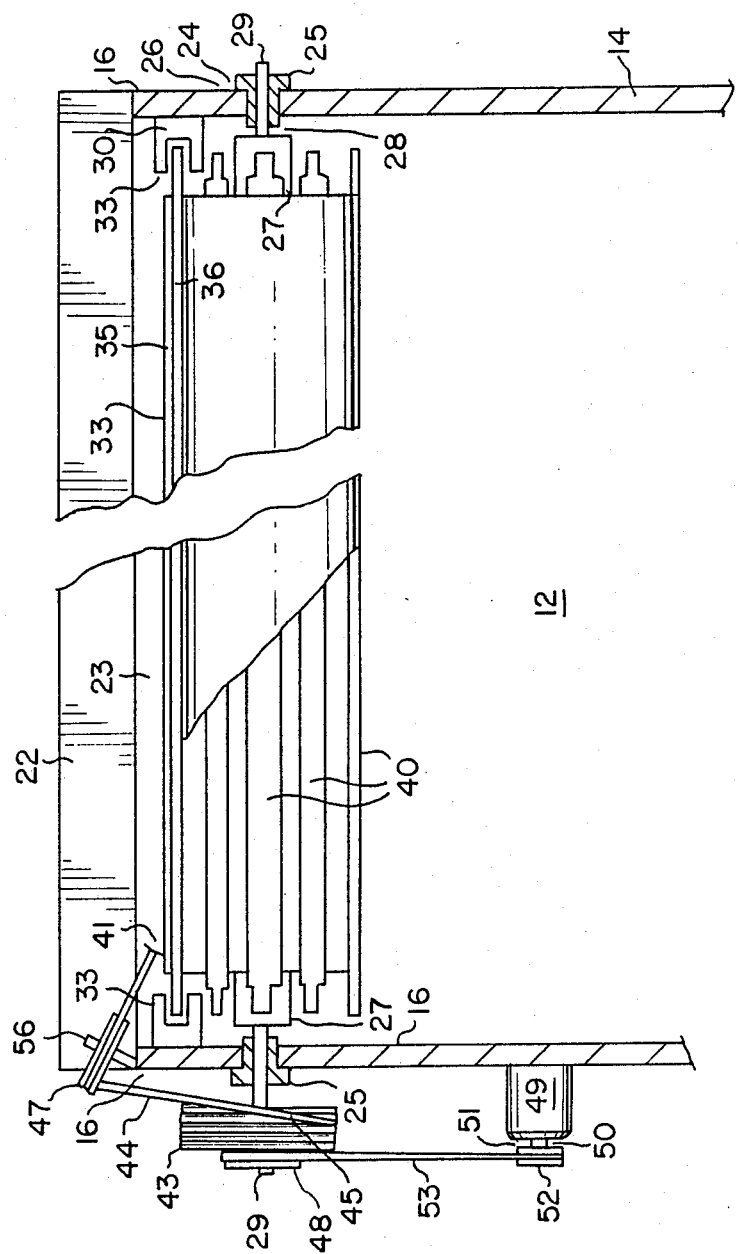
FIG. 2 is a rear view, partially in section, of the embodiment of FIG. 1.
Figure 3:
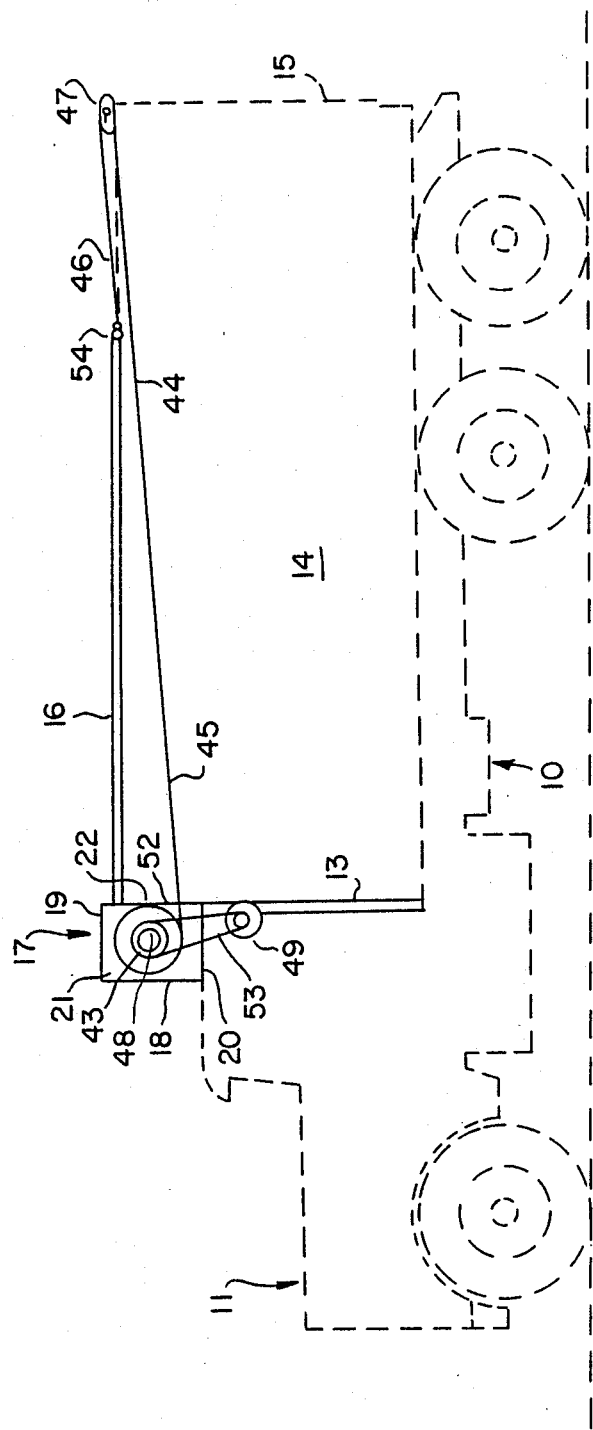
FIG. 3 is a side view of the embodiment of FIG. 1 shown in operational association with a truck having an open cargo area.
Figure 4:
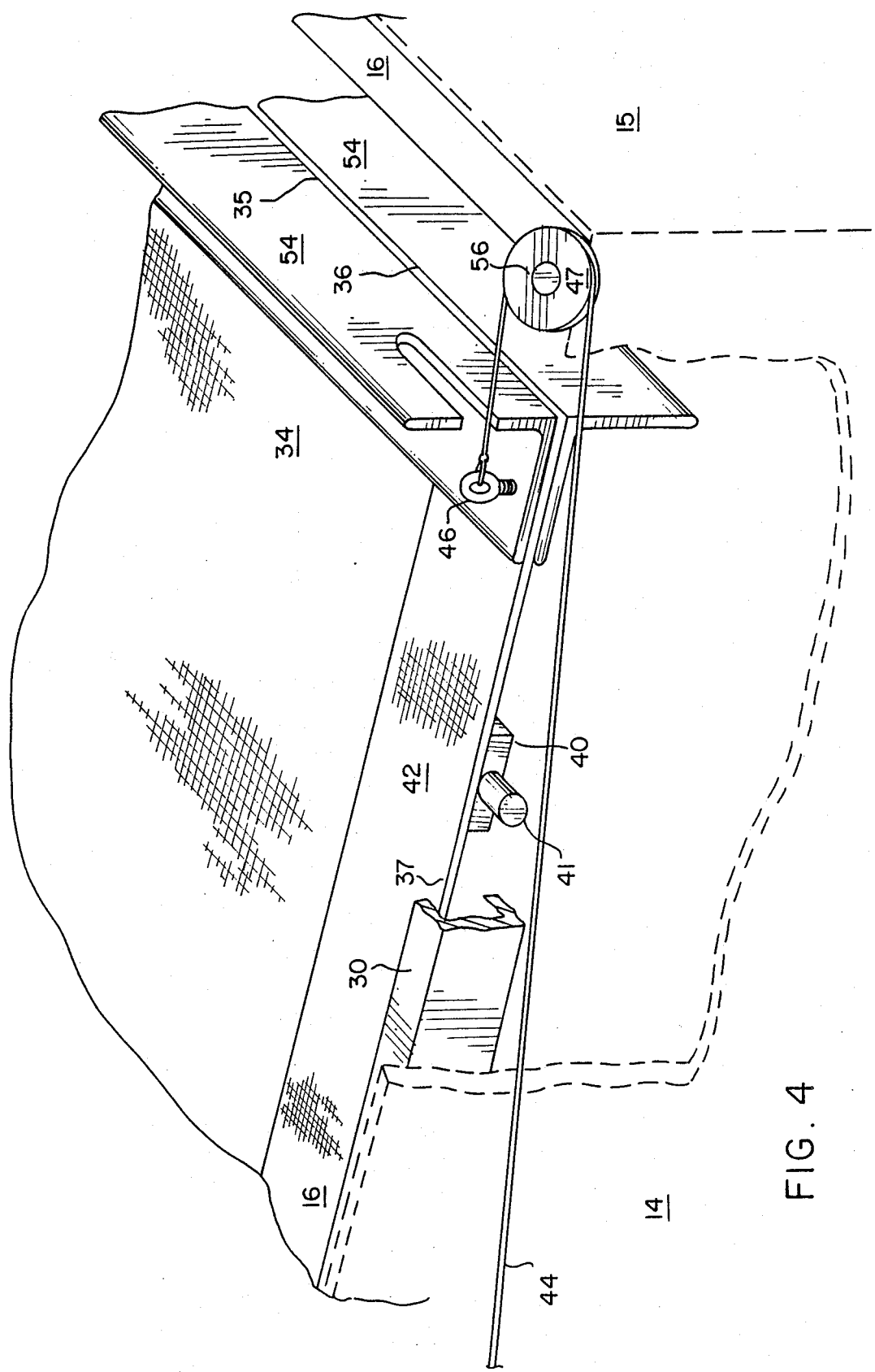
FIG. 4 is a fragmentary perspective view of the cover component of the embodiment of FIG. 1.

Referring to FIGS. 1-4, an embodiment of the apparatus of the improved overhead covering device 9 of this invention is shown in operative association with a bulk-loading truck 10 having cab section 11 and open-top cargo space 12 bounded by front, opposed side, and rear walls 13, 14, and 15, respectively. The walls have upper edges 16.

The covering device employs a storage housing 17 defined by front, top, bottom, and opposed side panels 18, 19, 20 and 21, respectively. Rear panel 22 is fixedly associated with front wall 13 and has elongated opening 23 disposed above upper edge 16 of front wall 13. Opposed side panels 21 have inner and outer surfaces 57 and 58, respectively. Coaxially aligned central apertures 24 penetrate the side panels, and flanged bushings 25 are fixedly associated with outer surfaces 23. The bushings have centered cylindrical bores 26 coaxially aligned with apertures 24.

Cylindrical winding drum 27 is disposed between side panels 21, and coaxially mounted upon a freely rotatable drum shaft 28. The drum shaft has opposed extremities 29 penetratively journaled to cylindrical bores 26.

Paired parallel horizontal elongated guide means 30 are affixed to upper edges 16 of side walls 14. The guide means have rear extremities 31, and front extremities 32 fixedly associated with rear panel 22. Rear extremities 31 terminate at the upper edge of rear wall 15. The guide means have facing channels 33 horizontally aligned with elongated opening 23.

Flexible fabric cover 34 has upper and lower surfaces, 35 and 36, respectively, opposed edges 37, a proximal extremity 38 tangentally afffixed to drum 27, and a free distal extremity 39. The flexible fabric may be in the form of "Tru Tarp", an 18 oz./sq.yd. vinyl-reinforced nylon. Alternatively, the cover may be any flexible, water impervious sheet material, which may be comprised of a fabric, film, or laminates and composites thereof. The cover has a multiplicity of rigid, parallel, elongated, reinforcing slats 40 of uniform cross section, spaced apart in a horizontal plane, and bonded to lower surface 36. The slats have opposed ends 41 extending beyond opposed edges 37 and adapted to slidably engage channels 33. Cover 34 is adapted to be spirally wound upon drum 27, thereby causing forward movement of slats 40 within channels 33. The channels serve to maintain the central position of the cover as it is wound upon the drum. Slats 40, in the form of "Overhead Door" brand 1-C-187 slide bars, provide reinforcement to the deployed cover the hold the edges in close proximity to guide means 30. In the illustrated embodiment, the edges of the cover are reinfoced by fabric strips 42.

Flanged cylindrical spool 43 is coaxially mounted upon one of opposed extremities 29. Freely rotatable pulley 47 is fixedly associated with upper edge 16 of said rear wall 15.

Cable 44 has a first extremity 45 tangentially affixed to spool 43 and adapted to be spirally wound thereupon counter-rotationally with respect to cover 34 upon drum 27. The cable has a second extremity 46 extending rearwardly, around pulley 47, which rotates about spindle 56, and fixedly associated with distal extremity 39 of the cover by means of screw-eye 55. Flanged driven wheel 48 is coaxially mounted upon an extremity 29 of the drum shaft. DC Motor 49 is fixedly associated with housing 17 and has a rotating drive shaft 50 disposed in parallel relationship with drum shaft 28. The drive shaft has a distal extremity 51 terminating in a flanged drive wheel 52 in parallel, coplanar disposition to driven wheel 48. Continuous flexible drive belt 53 is adapted to rotatively engage driven wheel 48 and drive wheel 52.

Rigid transverse member 54 is associated with distal extremity 39 of the cover.

In operation, as shaft 50 is rotated clockwise, the cable is wound upon spool 43 and in turn pulls the cover rearward along channels 33. Reverse rotation of shaft 50 causes the cover to wind upon drum 27 and simultaneously pays out cable from spool 43.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

While the above description contains many specificities, the reader should not construe these as limitations on the scope of the invention, but merely as exemplifications of preferred embodiments thereof. Those skilled in the art will envision many other possible variations are within its scope. Accordingly, the reader is requested to determine the scope of the invention by the appended claims and their legal equivalents, and not by the examples which have been given.

Having thus described my invention, what is claimed is:

1. An improved overhead covering device for a transportable open top cargo compartment of rectangular configuration bounded by front, opposed side, and rear walls, said walls having upper edges, said covering device comprised of:
   (a) a storage housing having front, top, bottom, and opposed side panels, and a rear panel fixedly associated with said front wall and having an elongated opening disposed above said upper edge of said front wall, said opposed side panels having inner and outer surfaces, coaxially aligned apertures, and bushings associated with said apertures,
   (b) a cylindrical winding drum disposed between said side panels and coaxially mounted upon a drum shaft, said drum shaft having opposed extremities journaled to said bushings.
   (c) paired parallel horizontal elongated guide means attached to the upper edges of said side walls, having rear extremities adjacent said rear wall and front extremities adjacent said front wall, said guide means having facing channels horizontally aligned with said elongated opening,
   (d) a flexible cover having upper and lower surfaces, opposed lateral edges, a proximal extremity tangentially affixed to said drum, a free distal extremity, and a multiplicity of elongated, reinforcing slats attached to said cover in spaced apart parallel relationship and having opposed ends extending beyond said lateral edges and adapted to slidably engage said channels, said cover adapted to be spirally wound upon said drum, thereby causing forward movement of said slats within said channels,
   (e) a flanged spool mounted upon an extremity of said drum shaft,
   (f) a freely rotatable pulley positioned adjacent the upper edge of said rear wall,
   (g) a cable having a first extremity tangentially affixed to said spool and adapted to be spirally wound thereupon counter-rotationally with respect to said cover upon said drum, said cable having a second extremity extending rearwardly, around said pulley and fixedly associated with the distal extremity of said cover, and
   (h) motor means for rotating said drum shaft in either direction, 2. The covering device of claim 1 wherein a rigid transverse member is associated with the distal extremity of said cover.

3. The covering device of claim 1 wherein the channels of the guide means are lined with a resilent material to facilitate sliding of the opposed ends of said slats.

4. The covering device of claim 1 wherein the edges of the cover are reinforced by an additional flexible layer.

5. The covering device of claim 1 wherein said cargo compartment is associated with an automotive vehicle.

6. The covering device of claim 1 wherein a driven wheel is mounted upon an extremity of said drum shaft, said motor means has a drive shaft disposed in parallel relationship with said drum shaft, said drive shaft having a distal extremity which supports a drive wheel in coplanar disposition to said driven wheel, and a drive belt interengages said driven wheel and drive wheel.

* * * * *